W. COOPER.
Chain Pump Bucket.

No. 167,990. Patented Sept. 21, 1875.

WITNESSES
Franck L. Durand
C. L. Evert

INVENTOR
Wm. Cooper
By Alexander Mason
Attorneys

UNITED STATES PATENT OFFICE.

WILLIAM COOPER, OF YPSILANTI, MICHIGAN, ASSIGNOR OF TWO-THIRDS HIS RIGHT TO CHARLES E. COOPER AND JAMES C. COOPER, OF SAME PLACE.

IMPROVEMENT IN CHAIN-PUMP BUCKETS.

Specification forming part of Letters Patent No. 167,990, dated September 21, 1875; application filed August 14, 1875.

*To all whom it may concern:*

Be it known that I, WILLIAM COOPER, of Ypsilanti, in the county of Washtenaw and in the State of Michigan, have invented certain new and useful Improvements in Buckets for Chain-Pumps; and do hereby declare that the following is a full, clear, and exact description thereof, reference being had to the accompanying drawings and to the letters of reference marked thereon, making a part of this specification.

My invention relates to buckets for chain-pumps; and it consists in the construction of two disks, one provided with a screw, and the other with a closed socket having interior female screw-threads, in combination with a rubber or elastic packing, as will be hereinafter more fully set forth.

In order to enable others skilled in the art to which my invention appertains to make and use the same, I will now proceed to describe its construction and operation, referring to the annexed drawing, in which—

Figure 1:
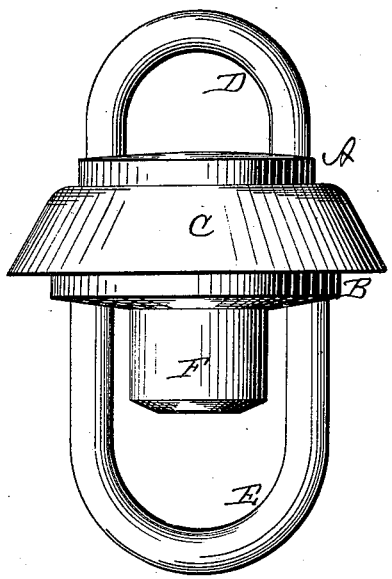
Figure 2:
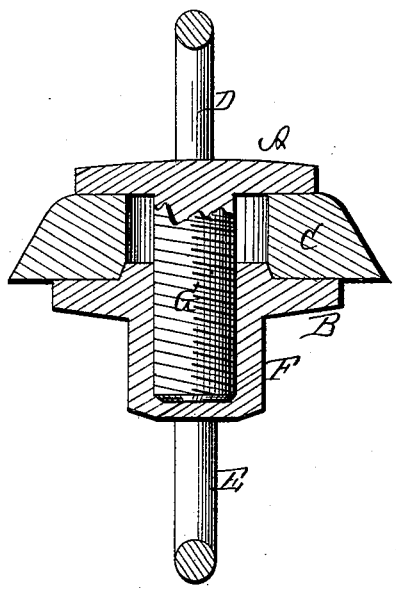

Figure 1 is a side elevation of my chain-pump bucket. Fig. 2 is a longitudinal vertical section of the same.

A represents a disk of any suitable dimensions, provided on its under side with a screw, G, and on the upper side with a bail or loop, D. B is another disk, provided in the center with a downward-projecting socket, F, closed at its lower end and provided with interior screw-threads. The disk B is further provided with a bail, E, as shown. The intermediate packing C, which is of india-rubber or some other elastic material, is made of sufficient thickness that it will expand by compression to fill the chamber of the lifting-tube, as is usual in such cases.

My object more particularly in this invention is that, while I make a bail above and below the bucket, by means of which the series of buckets may be connected, I form a close socket-joint for the screw G, which will protect it from corrosion and rust.

The lower end of the socket F being closed, the water is prevented from entering it and corroding the threads of the screw.

A washer may be introduced to compensate for any mashing together of the rubber packing by continued pressure.

I do not broadly claim a bucket for chain-pumps in which the rubber is secured between two disks by means of a screw, as I am aware such is not new.

Having thus fully described my invention, what I claim as new, and desire to secure by Letters Patent, is—

The disk B, provided with a socket, F, having a closed end, in combination with the screw G of the disk A, whereby the end of said screw is protected, as set forth.

In testimony that I claim the foregoing I have hereunto set my hand this 11th day of August, 1875.

WM. COOPER.

Witnesses:
H. A. HALL,
J. M. MASON.